US008998164B2

(12) United States Patent
Marquardt et al.

(10) Patent No.: US 8,998,164 B2
(45) Date of Patent: Apr. 7, 2015

(54) INSULATED FOOT PAD FOR A TRIPOD

(76) Inventors: Sherman Marquardt, Kalispell, MT (US); Gary Byers, Columbia Falls, MT (US)

(*) Notice: Subject to any disclaimer, the term of this patent is extended or adjusted under 35 U.S.C. 154(b) by 0 days.

(21) Appl. No.: 12/978,267

(22) Filed: Dec. 23, 2010

(65) Prior Publication Data

US 2011/0147558 A1 Jun. 23, 2011

Related U.S. Application Data

(60) Provisional application No. 61/289,926, filed on Dec. 23, 2009.

(51) Int. Cl.
*F16M 11/36* (2006.01)
*A47B 91/06* (2006.01)

(52) U.S. Cl.
CPC ............... *F16M 11/36* (2013.01); *A47B 91/06* (2013.01)

(58) Field of Classification Search
CPC ....... F16M 9/00; F16M 11/36; F16M 11/247; D03D 49/025
USPC ............... 248/346.01, 346.02, 346.04, 346.2, 248/346.11, 688, 677, 678, 615, 188.9, 634, 248/638, 633, 635, 188.8; 108/57.33
See application file for complete search history.

(56) References Cited

U.S. PATENT DOCUMENTS

| | | | | |
|---|---|---|---|---|
| 759,408 | A | * | 5/1904 | Tonini ................................ 16/39 |
| 1,374,029 | A | * | 4/1921 | Prickett ......................... 248/615 |
| 1,489,206 | A | * | 4/1924 | Greene ............................ 16/43 |
| 1,746,902 | A | * | 2/1930 | Persons ......................... 248/615 |
| 1,806,341 | A | * | 5/1931 | Gavaza ......................... 248/615 |
| 1,814,334 | A | * | 7/1931 | Potigian ...................... 248/188.9 |
| 1,898,309 | A | * | 2/1933 | Noelting ....................... 16/42 R |
| 1,909,620 | A | * | 5/1933 | Lang ............................. 182/110 |
| 1,930,223 | A | * | 10/1933 | Chason ......................... 16/42 T |
| 2,875,552 | A | * | 3/1959 | Stillman .................... 248/188.9 |
| 2,902,794 | A | * | 9/1959 | Ehrgott ..................... 248/188.9 |
| 2,921,760 | A | | 1/1960 | Wheeler |
| 3,138,893 | A | * | 6/1964 | Rupar ...................... 248/346.11 |
| 3,219,362 | A | * | 11/1965 | Epstein ...................... 280/763.1 |
| 3,477,674 | A | * | 11/1969 | Schaller ....................... 248/615 |
| 3,662,428 | A | * | 5/1972 | Koehl .............................. 16/43 |
| 3,662,856 | A | * | 5/1972 | D'Amico et al. ............. 182/108 |
| 4,338,053 | A | * | 7/1982 | Abel .............................. 410/94 |
| 4,421,290 | A | * | 12/1983 | Frank .......................... 248/558 |
| 4,801,228 | A | * | 1/1989 | Van Gompel .................. 410/94 |
| 5,081,740 | A | * | 1/1992 | Smith ......................... 16/42 R |
| 5,273,182 | A | * | 12/1993 | Laybourne .................... 220/740 |
| D376,753 | S | * | 12/1996 | Nakamura ...................... D8/374 |
| 5,743,506 | A | * | 4/1998 | Adams ..................... 248/346.11 |
| 6,006,677 | A | * | 12/1999 | Apps et al. ................. 108/57.25 |
| 6,129,327 | A | * | 10/2000 | Dubois ......................... 248/634 |

(Continued)

FOREIGN PATENT DOCUMENTS

DE 459437 C * 4/1927
DE 459437 C * 5/1928

(Continued)

*Primary Examiner* — Terrell McKinnon
*Assistant Examiner* — Eret McNichols
(74) *Attorney, Agent, or Firm* — Jean Kyle

(57) ABSTRACT

An insulated foot pad for a tripod has an insulated block sandwiched between two plates. The plates are made of a material that is a poor conductor of heat. Tripod legs placed on the foot pads will not sink into the snow on sunny days nor into warm asphalt on hot days.

11 Claims, 4 Drawing Sheets

(56) References Cited

U.S. PATENT DOCUMENTS

| | | | |
|---|---|---|---|
| 6,243,265 B1 * | 6/2001 | Wong et al. | 361/704 |
| 6,386,586 B1 * | 5/2002 | Ulery et al. | 280/762 |
| 6,427,965 B1 * | 8/2002 | McCracken | 248/633 |
| D513,583 S * | 1/2006 | Chase | D8/374 |
| 7,023,698 B2 * | 4/2006 | Tung | 361/697 |
| 7,762,506 B2 * | 7/2010 | Beshore | 248/188.9 |
| 7,770,853 B2 * | 8/2010 | Shiffler et al. | 248/188.9 |
| 8,006,629 B2 * | 8/2011 | Naidu | 108/56.3 |
| 8,714,507 B1 * | 5/2014 | Lee et al. | 248/346.01 |
| 2004/0159266 A1 * | 8/2004 | Fisch et al. | 108/57.25 |
| 2007/0290104 A1 * | 12/2007 | Denison et al. | 248/188.8 |
| 2008/0236455 A1 * | 10/2008 | Naidu | 108/56.1 |
| 2009/0114129 A1 * | 5/2009 | Smith et al. | 108/57.25 |
| 2010/0043676 A1 * | 2/2010 | Apps et al. | 108/53.3 |
| 2011/0017106 A1 * | 1/2011 | Muirhead | 108/57.27 |
| 2011/0120353 A1 * | 5/2011 | Jensen et al. | 108/57.25 |
| 2014/0090581 A1 * | 4/2014 | Schultz | 108/57.12 |
| 2014/0319315 A1 * | 10/2014 | Koberg | 248/678 |

FOREIGN PATENT DOCUMENTS

| | | | |
|---|---|---|---|
| DE | 493464 C | * | 7/1928 |
| DE | 493464 C | * | 3/1930 |
| FR | 611573 A | * | 2/1926 |
| FR | 611573 A | * | 10/1926 |

* cited by examiner

INSULATED FOOT PAD FOR A TRIPOD

CROSS-REFERENCE TO RELATED APPLICATIONS

This application claims the benefits of U.S. Provisional Application No. 61/289,926, filed Dec. 23, 2009, the disclosure of which is hereby incorporated by reference in its entirety including all figures, tables and drawings.

STATEMENT REGARDING FEDERALLY SPONSORED RESEARCH OR DEVELOPMENT

Not applicable

REFERENCE TO SEQUENCE LISTING, A TABLE, OR A COMPUTER PROGRAM LISTING COMPACT DISC APPENDIX

Not applicable

BACKGROUND OF THE INVENTION

In the last several years land survey equipment has changed dramatically. Changes in technology have allowed this equipment to provide levels of accuracy never before achieved. Though survey equipment has changed, it is still mounted, as survey equipment has been for ages, on a tripod. It is still necessary that the tripod hold survey equipment steady and level to achieve accurate readings. This can be a difficult task since surveys are conducted in the field under temperature extremes. Most field survey tripods have spiked feet to hold the ground. Problems occur when these tripods are set on snow or ice. Within minutes the feet melt through the snow causing instrument position to change. Similar problems occur when a tripod is placed on asphalt on a warm day. The tripod legs sink into the soft asphalt. Many types of tripod feet are available. The tripod feet are designed to grip different surfaces. These various feet however do not prevent the tripod from shifting as the feet melt through the surface on which they are placed. Some insulated foot pads have been designed for machinery but they are designed primarily to dampen vibration from the machine (see U.S. Pat. No. 2,921,760).

A need remains for means to prevent tripod feet from melting into a surface on which they are placed. Such a means would allow surveys to be conducted with more accuracy, for less cost, and in less time since the surveyor is not constantly resetting the tripod.

All patents, patent applications, provisional patent applications and publications referred to or cited herein, are incorporated by reference in their entirety to the extent they are not inconsistent with the teachings of the specification.

BRIEF SUMMARY OF THE INVENTION

The subject invention involves an insulated foot pad for a tripod foot or instrument foot. Each pad has two rigid plates which sandwich a piece of insulating foam. The plates provide the pad surface area and are constructed for minimal heat conductivity. For example, the plates are made from plastic, which conducts heat poorly, and are preferably a light color to reflect the suns rays. Pins on the outside of one plate snap into hollow conduits in another plate to keep heat transfer to a minimum when the plates are connected.

DETAILED DESCRIPTION OF THE INVENTION

Figure 1:
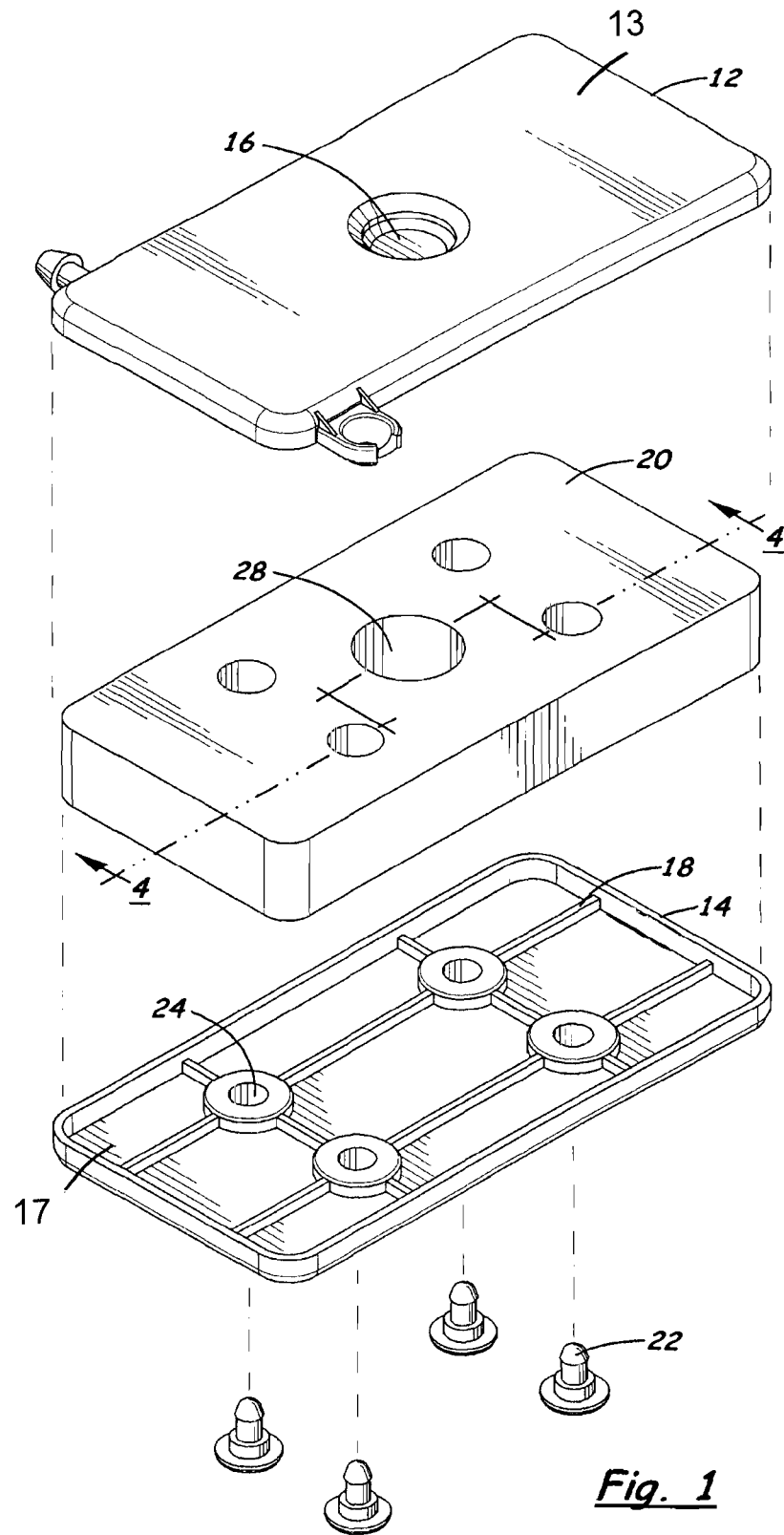
FIG. 1 is a top exploded perspective view of a preferred embodiment of the insulated foot pad of the subject invention.
Figure 2:
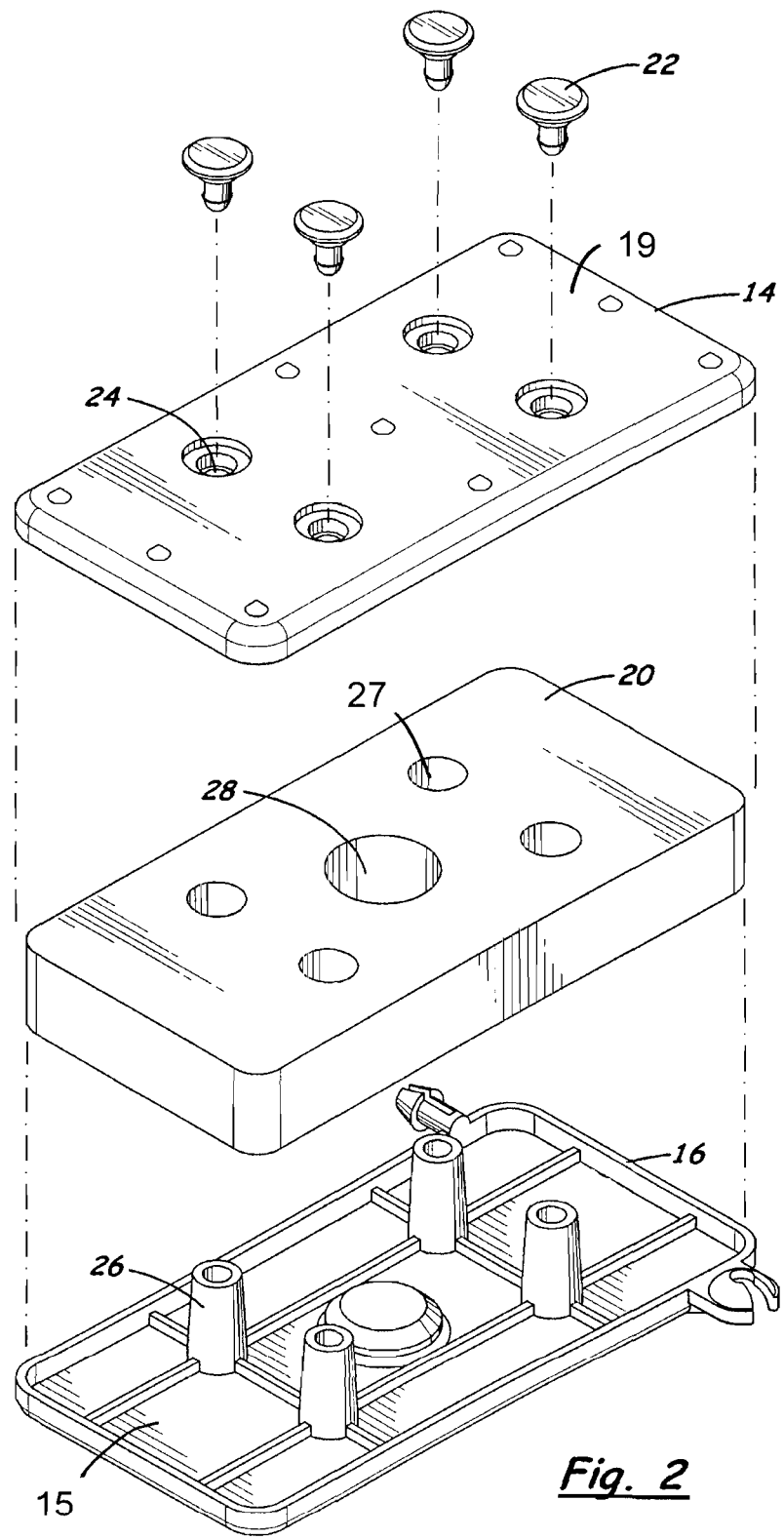
FIG. 2 is a bottom exploded perspective view of a preferred embodiment of the insulated foot pad of the subject invention.
Figure 3:
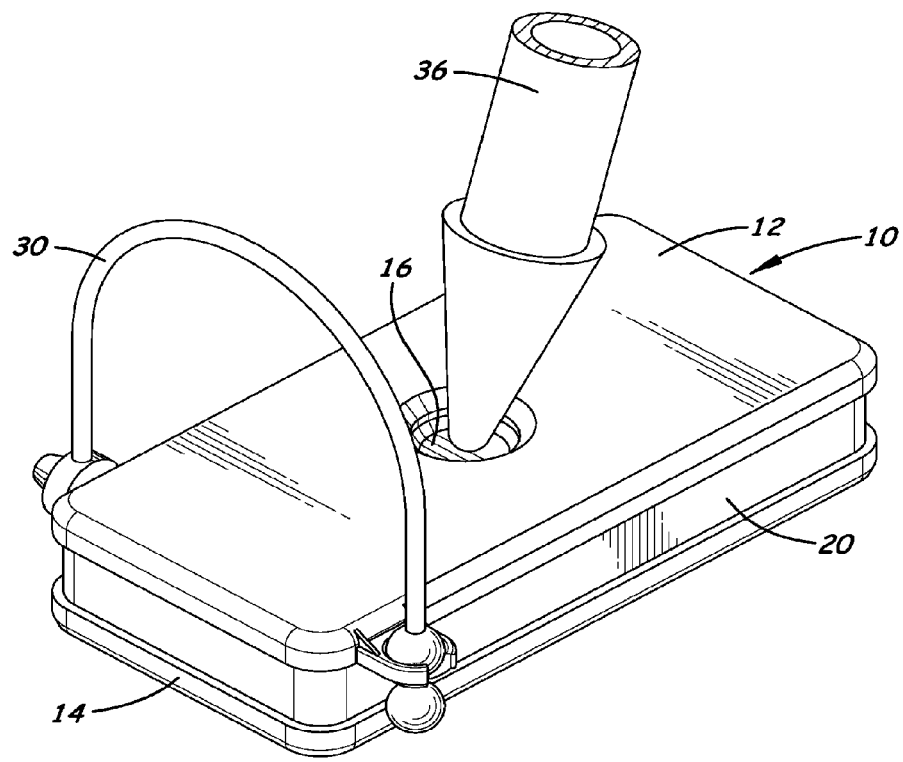
FIG. 3 is a top perspective view of a preferred embodiment of the insulated foot pad of the subject invention supporting a tripod foot.

The invention involves an insulated foot pad for feet of an instrument. A block of insulating material is sandwiched between two plates that conduct heat poorly.

A preferred embodiment of the subject insulated foot pad 10 is shown in the appended figures. In an exemplified embodiment, the insulated foot pad is used to support a tripod foot on a surface. In the exemplified embodiment an insulating block of foam is sandwiched between two plastic plates. A top plate 12 having an top surface 13 and a bottom surface 15 contacts the foot of the tripod while a bottom plate 14 having an upper surface 17 and a lower surface 19 contacts the ground. The feet of a tripod for a field survey are most often spiked to anchor the tripod in soft ground. These often black spikes rapidly melt through ice and snow. The plates of the pad of the subject invention provide surface area for the tripod foot. The plates can be any shape or size. In the exemplified embodiment the plates are rectangular and are of sufficient size to offer surface area but are not too large to be cumbersome when carrying them in the field. In a particularly preferred embodiment, the top plate 12 has a recess 16 to capture the spike of a tripod foot.

The plates should be made of a material that conducts heat poorly. In the exemplified embodiment, the plates are molded of plastic. Plate thickness should be kept as thin as possible to prevent heat accumulation. Plates however need to be durable, and strong enough to support the survey equipment. The exemplified molded plates are thin but have reinforcing ribs 18 for strength. The ribs prevent full contact between the plate and the insulating material to further reduce heat transfer.

The plates enclose insulating material 20. In the exemplified embodiment, the insulating material is closed cell foam. The foam is resistant to the elements and will not foul if wet. The foam further adds structure and strength to the pad. One skilled in the art would realize that other insulating materials can be used successfully in the pad of the subject invention, including air.

The two plates of the exemplified embodiment sandwich the insulating material to form a single foot pad unit 10. The plates can be affixed to the foam by, for example, an adhesive. Alternatively, the plates can be attached to one another capturing the insulating material. It is important however that the means to connect the plates to one another should not conduct heat from one plate to the other. In the exemplified embodiment, pins 22 snap through apertures 24 in one plate and into hollow conduits 26 molded into the other plate. The hollow conduits 26 transfer less heat than a solid peg might. Bores 27 are cut into the insulating material to allow the hollow conduits or hollow pipes 26 to pass through the closed cell foam of the exemplified embodiment. On skilled in the art would recognize there are several ways to connect the plates to one another through hollow conduits. It is only necessary that the conduits are secured to each plate. In the exemplified embodiment, four conduits are used to secure the rectangular plates. Fewer or more points of connection may be needed to secure plates of different shapes. It is preferred that the least number of connection points be used to minimize the possibility of heat transfer.

The insulating foot pad shown in the figures was designed for use with a tripod for land and construction survey. The plate size provides sufficient surface area to support a tripod and its equipment. The recess 16 holds a typical spike type tripod foot 36. It is noted that in order to keep the convex edge of the recess from contacting the foam and perhaps transferring heat a hole 28 is cut into the foam beneath the recess. The rugged plastic construction will not shatter in cold weather. The plates are white to reflect the sun's rays. The foam core will not break down with exposure to sun, heat, or water. The pad has a handle 30 so that it can be easily grabbed, removed, and carried when the tripod needs to be moved.

Figure 4:
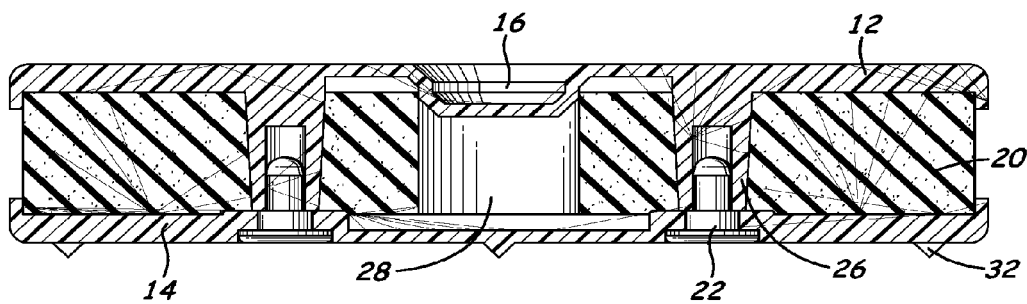
FIG. 4 is a cross-sectional view along line 4-4 of FIG. 1 of a preferred embodiment of the insulated foot pad of the subject invention.
Figure 5:
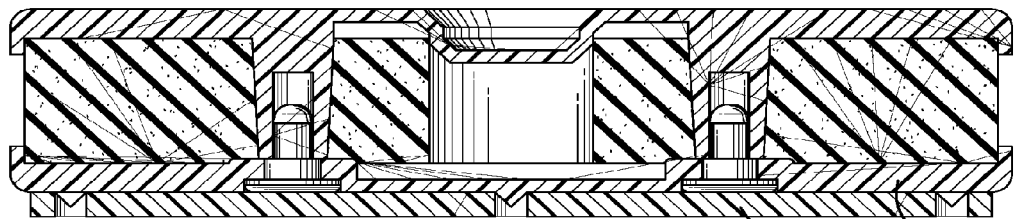
FIG. 5 is a cross-sectional view along line 4-4 of FIG. 1 of a preferred embodiment of the insulated foot pad of the subject invention to which a rubberized pad is attached.
Figure 6:
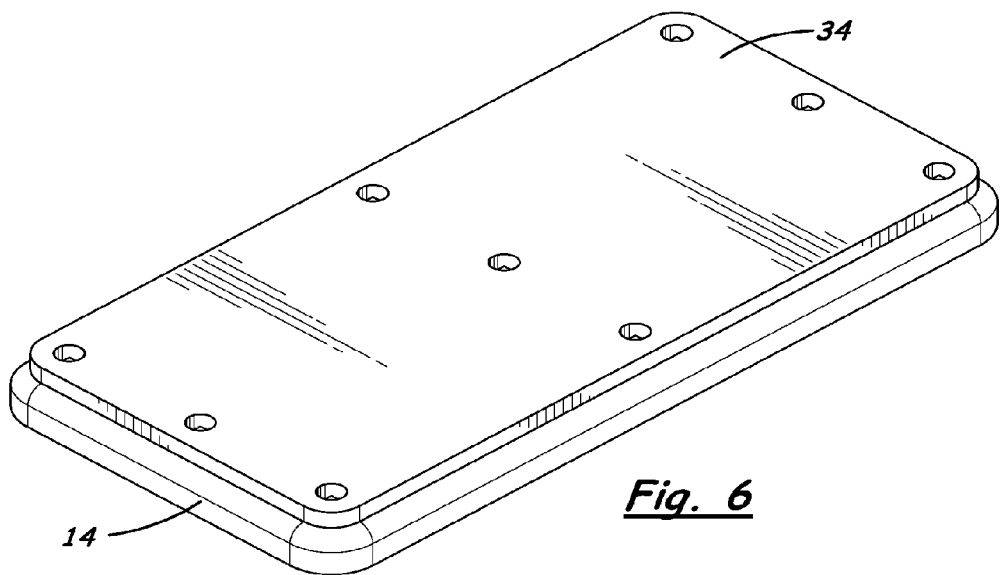
FIG. 6 is a bottom perspective view of a preferred embodiment of a bottom plate of the insulated foot pad of the subject invention.

In a particularly preferred embodiment, the bottom plate of the pad has spikes 32 to grip the ground (FIG. 4). The spikes allow the pad to grip ice and snow. The number, depth and configuration of the spikes on the bottom of the pad can vary to meet different surface environments. In another particularly preferred embodiment, the bottom plate of the pad is rubberized to grip smooth surfaces (FIG. 6). The rubberized facing of the plate can be a pad 34 applied to the bottom of the plate which covers the entire bottom or can be strips or buttons of rubberized material on the bottom surface of the plate. Alternatively, the rubberized facing can be integral with the bottom plate.

To use the subject pads, chose a location for the tripod. On frozen ground, snow, mud or gravel, put a pad in the spot where each leg will go. Firmly push each pad down with your foot. On slick ice, and hard surfaces, rough up the area or chip out a spot for each pad to insure the pads will not slip. Place each foot of the tripod in the center of the recess on each pad. The tripod legs should not be pushed into the pad. The tripod erected on the subject pads should stay level for at least 15 minutes even on the sunniest days. When measurements are complete, remove the tripod and pull the pads up by their handles, loop them together and move on to the next location.

Applicants note that the subject device can be configured in different ways for different purposes. The pads of the subject invention can be attached to, or integrated into, the tripod legs. For example, a hinged bracket can be used to affix the pads to the tripod legs so they can be swung beneath the tripod feet. Likewise, tripods can be provided where the tripod feet are the insulated foot pads. Additionally, a different choice of insulating materials may not require the pad to have two plates. It is only important that there be minimal heat transfer to the material contacting the ground so that the portion of the pad contacting the ground will slow the melt of underlying snow and reduce further softening of asphalt.

It is understood that the foregoing examples are merely illustrative of the present invention. Certain modifications of the articles and/or methods may be made and still achieve the objectives of the invention. Such modifications are contemplated as within the scope of the claimed invention.

The invention claimed is:

1. An insulated foot pad to be placed under a foot of an instrument to occupy the space between the foot of the instrument and the instrument's supporting surface comprising:
    a first continuous plate of a poor heat conducting material that acts to prevent access of the instrument foot with an insulating layer, the continuous first plate comprising a top surface disposed under the foot of the instrument, and a bottom surface within an edge, at least one hollow pipe extending from the bottom surface of the first continuous plate and away from the edge;
    a second continuous plate of a poor heat conducting material that acts to prevent the insulating layer from contacting the supporting surface, the second plate comprising an upper surface and a lower surface, the lower surface contacting the supporting surface, the second plate comprising at least one aperture, the at least one hollow pipe aligning with and contacting the at least one aperture;
    the insulating layer disposed between the bottom surface of the first continuous plate and the upper surface of the second continuous plate, the at least one hollow pipe extending through the insulating layer and disposed near the upper surface of the second plate; and
    at least one pin protruding through the at least one aperture in the second plate, the at least one pin snaps into an end of the at least one hollow pipe to connect the first continuous plate to the second plate;
    wherein the first continuous plate contacts the second continuous plate only through the at least one hollow pipe so that the insulating foot pad reduces the transfer of heat from the foot of the instrument to the supporting surface.

2. The insulating foot pad of claim 1, wherein said insulating layer is closed cell foam.

3. The insulating foot pad of claim 1, further comprising a recess in said top surface of said first continuous plate to capture the foot of the instrument.

4. The insulating foot pad of claim 3, wherein a hole is disposed in said insulating layer beneath said recess.

5. The insulating foot pad of claim 1, further comprising at least one spike on a side of said second plate contacting the supporting surface.

6. The insulating foot pad of claim 1, further comprising a rubberized facing on a side of said second plate contacting the supporting surface.

7. The insulating foot pad of claim 1, wherein at least one of said first continuous plate and said second continuous plate are molded plastic.

8. The insulating foot pad of claim 7, wherein said at least one molded plastic plates has reinforcing ribs.

9. The insulating food pad of claim 8, wherein said reinforcing ribs are on the bottom surface of the first continuous plate and the upper surface of the second continuous plate.

10. The insulating foot pad of claim 1, further comprising a handle connected to said first continuous plate.

11. The insulating food pad of claim 1, wherein said insulating layer comprising at least one bore, and said at least one hollow pipe passes through said at least one bore.

* * * * *